Jan. 5, 1926.  
E. F. ANDERSON  
TRACTOR HITCH FOR HEADERS  
Filed June 12, 1920 2 Sheets-Sheet 2
1,568,124
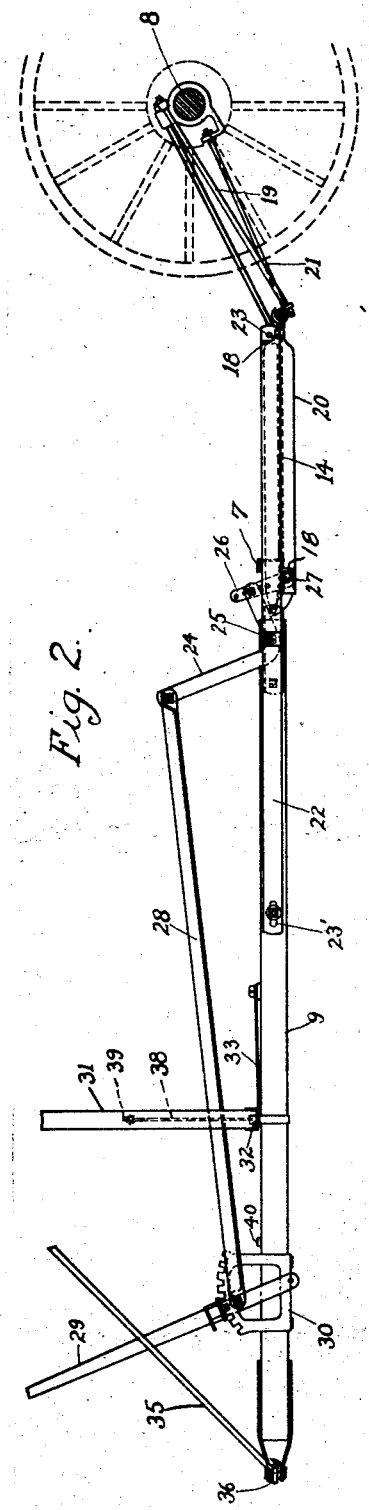
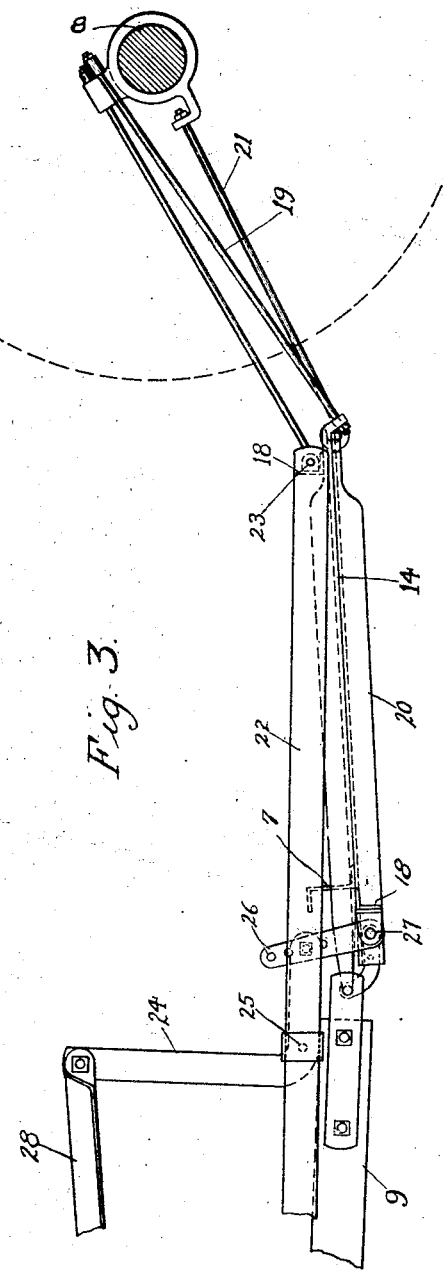
Inventor:-
Emil F. Anderson,
By Henry J. Savage
Atty.

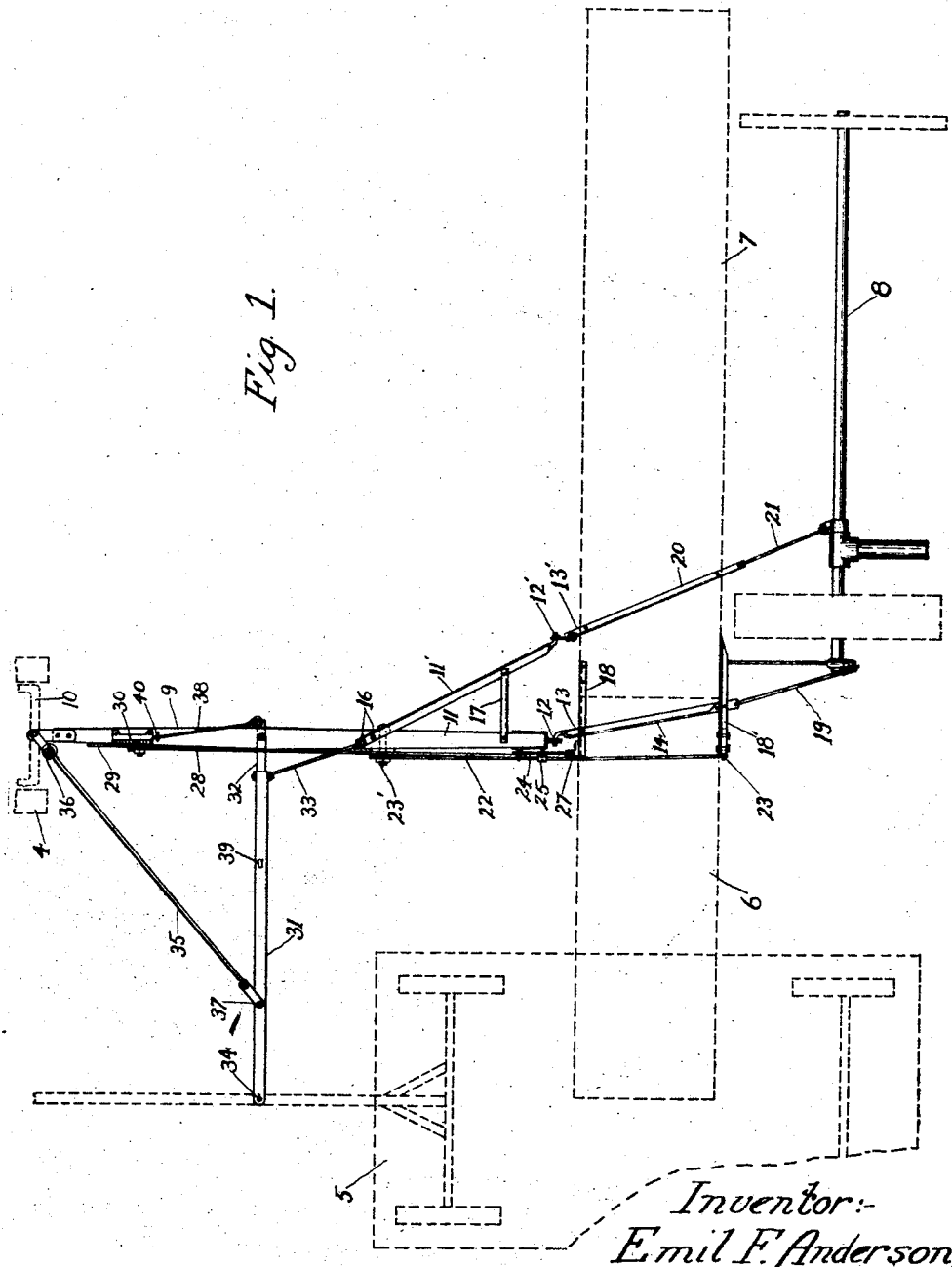

Patented Jan. 5, 1926.

1,568,124

UNITED STATES PATENT OFFICE.

EMIL F. ANDERSON, OF CHICAGO, ILLINOIS, ASSIGNOR TO INTERNATIONAL HARVESTER COMPANY, A CORPORATION OF NEW JERSEY.

TRACTOR HITCH FOR HEADERS.

Application filed June 12, 1920. Serial No. 388,641.

*To all whom it may concern:*

Be it known that I, EMIL F. ANDERSON, a citizen of the United States, residing at Chicago, in the county of Cook and State of Illinois, have invented certain new and useful Improvements in Tractor Hitches for Headers, of which the following is a full, clear, and exact specification.

My invention relates to agricultural implements that are adapted, or that may be adapted wth slight modification, to be propelled by tractors.

Owing to the scarcity of farm labor and the adaptation of tractors to agricultural work of all kinds, it has become necessary to devise means whereby one man may do the work formerly accomplished by two or more farm hands and to adapt existing types of implements for use with tractors.

An object of my invention is to provide a hitch adapted to be applied to existing headers without extensive modification of the implement thereby adapting the implement to use with a tractor.

Another object is to provide a hitch or draft connection adapted to connect a tractor and implement to propel the latter and providing means for controlling the implement from the tractor.

A further object is to provide a tractor hitch adapted to connect a tractor to a harvester and a barge whereby the two will be drawn in cooperative relation and the harvester may be adjusted from the tractor thereby enabling the operator of the tractor to perform the functions usually performed by three men, namely, the driver of the tractor, driver of the barge, and operator of the harvester.

Still another object is to provide a tractor hitch or draft member that is adapted to connect a tractor to a header and having means adapted to tow a barge in cooperative relation with the header, or omit the barge and propel the header or other implement alone when desired.

The above and other objects are attained by means of the device illustrated in the accompanying drawing in which—

Figure 1 is a plan view of my hitch connecting a tractor to a header and a barge.

Fig. 2 is a side elevation of my hitch showing the adjusting mechansim and means for connecting the hitch to the header platform and main axle.

Fig. 3 is a fragmentary side elevation showing the adjusting mechanism.

Referring to Fig. 1, the tractor 4 is connected by means of my draft connection to the barge or wagon 5, which is propelled in cooperative relation to the elevator 6 of a header having a cutter bar and platform 7 and main axle 8. The tractor hitch comprises a front draft member or tongue 9 pivotally connected at its front end to the draw bar 10 of the tractor and is forked or has two branches 11 and 11' at its rear end which are pivotally connected at 12, 12' to the two rear draft members 13, 13'. The fork 11 is a continuation of the main body of the tongue 9, while the fork 11' is preferably formed from a light angle iron secured to the tongue by bolts 16 and a brace 17. The rear draft member 13 is composed of a draft bar 14 which is secured to brackets 18, 18' rigid with the cutter-bar and rear sill of the platform 7 of the header and a pull rod 19 which is pivotally secured to the bar 14 at one end and to the main axle 8 at the other. The rear draft member 13' is composed of a draft bar 20 passing under and secured to the platform 7 and a pull rod 21 pivotally secured to the bar 20 at one end and to the main axle 8 at the other. It will be apparent that a pull exerted by the tractor on the tongue 9 will be transmitted through the draft bars 14 and 20 and the pull rods 19 and 21 to the axle of the header to propel the same. An adjusting bar 22 is pivotally secured at 23 to the extension piece or bracket 18' attached to the rear sill of the platform and has a slot and pin connection 23' at its opposite end with the draft member 9. A bell crank lever 24 is pivoted on the adjusting bar at 25 and has its short arm adjustably connected to a link 26 which is secured at 27 to the extension piece or bracket 18. The other arm of the bell crank is secured to one end of the link 28 which extends forwardly and is connected to an adjusting lever 29 mounted on the front end of the tongue 9 within easy reach of the operator of the tractor. A toothed sector 30 mounted near the front end of the tongue cooperates with the usual pawl carried by the lever to secure the lever in any desired position of adjustment. From the above description it will be apparent that forward movement of the lever 29 will rock the bell crank about its fulcrum 25 and raise the plaform 7 and that rearward movement of the adjusting lever will lower the platform, the platform being tilted about the axle 8 as is usual in headers and other harvesters.

A supplemental draft member 31 is pivotally connected at one end to a bracket 32 secured to the tongue 9 and braced by the link or bar 33. The other end of the supplemental draft tongue is adapted for connection to the tongue of the barge 5, as indicated at 34. A tie rod 35 is connected by a ring and clevis 36 to the front end of the main tongue, a single pin preferably being used to secure both the tongue and clevis to the tractor draw-bar. The other end of the tie rod is secured at 37 to the supplemental or barge draft member near the end adapted to be secured to the barge.

When it is desired to use my hitch without the barge, the member 31 and link 35 are swung to vertical position, as shown in Fig. 2, and are held in that position by the hook 38 which is secured at one end to the bracket 32 and is provided at its opposite end with a hook adapted to engage in an eye 39 on the supplemental draft member 31. When the member 31 is connected to the barge, the free end of the hook 38 is retained in a forked member or holder 40 on the tongue 9 as best shown in Fig. 1.

While I have shown and described the elements 9 and 11', 14 and 19, and 20 and 21, as being separate parts, this is to be understood as illustrative of one embodiment of my invention only, since it is within the contemplation of my invention that the members 9 and 11' may compose a single forked draft member and that the elements 14 and 19 may be a single draft member as may also the bars 20 and 21. In this connection, it is to be noted that the two pivot points 12 and 12' lie on the same axis, so that there is no binding at the pivots or distortion of any of the parts when the header platform is tilted.

Having thus described my invention, what I claim as new and desire to secure by Letters Patent is:

1. In a tractor hitch for harvesters, a pair of front draft members, rear draft members connected at one end to the front draft members and secured at their opposite ends to the axle of the harvester, means securing the rear draft members to the harvester platform, an adjusting bar connected to one of the front draft members, a lever carried by the same draft member, and means connecting the lever, bar and harvester whereby movement of the lever will adjust the harvester platform.

2. In a tractor hitch for harvesters, a plurality of front draft members, a rear draft member pivotally connected at one end to each of the front draft members and secured at its other end to the axle of the harvester, means securing the rear draft members to the harvester platform, an adjusting bar connected to one of the front draft members, an adjusting lever mounted on the same draft member, and means connecting the lever, bar and harvester whereby movement of the lever will tilt the harvester platform about the axle.

3. In a tractor hitch for harvesters the combination of a forked front member, a pair of rear members secured to the harvester and pivotally connected to the forks of the front member, an adjusting bar connected to the harvester at one end and to the front member at the other end, a bell crank fulcrumed on the bar, an adjusting lever mounted on the front member, means connecting the bell crank to the harvester, and means connecting the lever and bell crank.

4. In a tractor hitch for harvesters, a front draft member, a rear draft member pivotally connected thereto at one end and secured at its other end to the axle of a harvester, means securing the rear draft member to the harvester platform, an adjusting bar connected to the front member and to the harvester, an adjusting lever mounted on the front member, and means including a bell crank lever pivotally mounted on the bar for connecting the lever, bar and harvester whereby movement of the adjusting lever will operate the bell crank lever to tilt the harvester platform about the axle.

5. In a tractor hitch for harvesters, a main draft member pivotally connected at one end to a harvester, means mounted on the draft member and associated with the harvester for adjusting the latter, a supplemental draft member connected at one end to the main draft member and connected at its other end to a barge in cooperative relation to the harvester, and a tie rod connected to the main and supplemental draft members.

6. In a tractor hitch for harvesters, a main draft member adapted for connection at its front end to a tractor and connected at its rear end to a harvester, a supplemental draft member pivotally connected at one end to the main draft member and adapted to swing in a vertical plane, means for attaching the supplemental member to a barge when in a horizontal position, and means for locking the supplemental member in vertical position.

7. In a draft connection for harvesters, a main draft member, a rear draft member pivotally connected thereto at one end and connected to a harvester at the other end, adjusting means carried by the draft member and connected to the harvester, a supplemental draft member connected at one end to the main draft member and extending laterally therefrom for connection to a barge, a tie rod connecting the outer end of the supplemental member and front end of the main draft member, and means for holding the supplemental member in a vertical position when disconnected from the barge.

8. In a draft connection for harvesters, a draft member adapted for connection at its front end to a tractor, a rear draft member pivotally connected at its front end to the rear end of the first member and connected at its other end to the axle of a harvester, a rearwardly projecting arm on the first number, a second rear draft member pivotally connected at one end to the arm and secured at its other end to the axle, means connecting the two rear draft members to the cutter platform of the harvester, a bar connected at one end to the harvester and at the other end to the first draft member, an adjusting lever mounted on the first draft member adjacent the front end, and connections between the lever, bar and platform adapted to tilt the latter about the axle when the lever is operated.

In testimony whereof I affix my signature.

EMIL F. ANDERSON.